United States Patent [19]

Lee

[11] Patent Number: 5,911,512
[45] Date of Patent: Jun. 15, 1999

[54] FLUID BEARING APPARATUS HAVING A UNIFORM DYNAMIC PRESSURE DISTRIBUTION

[75] Inventor: Chang-woo Lee, Kyonggi-do, Rep. of Korea

[73] Assignee: Samsung Electronics Co., Ltd., Kyungki-Do, Rep. of Korea

[21] Appl. No.: 08/965,417

[22] Filed: Nov. 6, 1997

[30] Foreign Application Priority Data

Nov. 6, 1996 [KR] Rep. of Korea ............ 96-52435

[51] Int. Cl.[6] ............................................. F16C 32/06
[52] U.S. Cl. ........................................ 384/123; 384/112
[58] Field of Search ............................ 384/107, 112, 384/121, 123, 292, 368

[56] References Cited

U.S. PATENT DOCUMENTS 3,376,083  4/1968  Muijderman ............... 384/123
3,879,382  4/1975  Reinhoudt .................. 384/123
4,961,122  10/1990 Sakai et al. ............. 384/292 X
5,504,637  4/1996  Asada et al. ............. 384/107 X

FOREIGN PATENT DOCUMENTS 1762006  9/1992  U.S.S.R. .................... 384/123

*Primary Examiner*—Thomas R. Hannon
*Attorney, Agent, or Firm*—Sughrue, Mion, Zinn, Macpeak & Seas, PLLC

[57] ABSTRACT

A fluid bearing apparatus equipped with a thrust bearing having a uniform pressure distribution for effectively supporting the thrust load by dividing uniformly the fluid pressure generated in a dynamic pressure generating groove of the thrust bearing. In the thrust bearing, by gathering the fluid in different directions, at least two bending points which generate the maximum fluid pressure are repeatedly formed.

3 Claims, 4 Drawing Sheets

FLUID BEARING APPARATUS HAVING A UNIFORM DYNAMIC PRESSURE DISTRIBUTION

BACKGROUND OF THE INVENTION

1. Field of the Invention

The present invention relates to a fluid bearing apparatus having a uniform dynamic pressure distribution and, more particularly, to a fluid bearing apparatus having a uniform dynamic pressure distribution in which at least two bending parts are formed in order to generate fluid pressure to raise a rotary body from a supporting unit of the rotary body.

2. Description of the Related Art

Recently, as the computer-related industries have continuously been developed, driving motors for various kinds of facilities, such as a head driving apparatus for a video tape recorder (VTR), an optical polygon driving apparatus for a laser printer, a camcorder driving motor, etc., need to have a high density and a miniaturized form. Such driving apparatuses require a bearing which is precise and stable, and has a super high rotation performance. In compliance with such a requirement, a fluid bearing apparatus has been developed.

In a dynamic pressure fluid bearing there is commonly provided a fluid having a predetermined coefficient of viscosity in order to reduce the frictional force between a rotary body and a rotary body supporting unit which supports the thrust load of the rotary body. Dynamic pressure generating grooves are formed in the supporting unit of the rotary body to generate the dynamic pressure. By rotating the rotary body on the supporting unit of the rotary body with a predetermined speed, a predetermined pressure is generated between the rotary body and the supporting unit.

Generally, the dynamic pressure generating grooves have variously been developed. Out of the dynamic pressure generating grooves, herringbone-shaped grooves and spiral-shaped grooves are the most well known.

The operation of a head driving apparatus of a VTR equipped with the dynamic pressure fluid bearing apparatus applying one of the above-mentioned dynamic pressure generating grooves will be illustrated, with reference to FIG. 1.

As shown in the FIG. 1, the VTR head driving apparatus 20 includes: an upper drum 12 which is rotated and on which a head tip 11 for reading a video signal and an audio signal recorded on a VTR tape is mounted; a lower drum 13 which is fixed; a shaft 14 which is fixed to the lower drum 13 along the rotating center of the upper drum 12; a doughnut-shaped thrust bearing 15 which minimizes the friction between the upper drum 12 and the lower drum 13 caused by the thrust load of the upper drum 12; a stator 16 which is mounted to the shaft 14 but spaced apart from the center of the shaft 14; and a rotor 17 which is located on the upper drum 12 spaced from the stator 16 to generate the rotary power of the upper drum 12.

A plurality of herringbone-shaped dynamic pressure generating grooves are formed on the circumferential surface of the shaft 14, in order to support the radial load of the upper drum 12.

As the head tip 11 is located at the upper drum 12 of the VTR head driving apparatus 20 having the above-described structure, in the case where the head tip 11 is vibrated or oscillated, reproducing the video and audio signals becomes difficult and the state of storing the signals becomes bad. As a result, the role of the thrust bearing is very important.

Reference numerals 19a and 19 indicate a stator transformer and a rotary transformer, respectively.

FIG. 2 is a plan view illustrating the conventional thrust bearing 15. The thrust bearing 15 is a cylindrical doughnut shape having a predetermined height and an inside diameter to which the shaft 14 is tightly fitted. On the upper surface of the thrust bearing 15 where the thrust bearing 15 and the upper drum 12 contact, a plurality of dynamic pressure generating grooves 15a are formed.

Generally, as the thrust bearing 15 is repeatedly contacted/separated to/from the upper drum 12, it is usually made of a material which is resistant to abrasion.

The dynamic pressure generating groove 15a formed at the thrust bearing 15 is generally a cramped herringbone shape, and a plurality of the dynamic pressure generating grooves are arranged in a circle centering around the center of the thrust bearing 15 along the circumference at a predetermined interval.

The dynamic pressure generating groove 15a is etched at a predetermined depth by an etching process. When etching the plain surface, there are two wall sides and one base side. Out of the two wall sides, one is defined as a first side wall 15c and the other is defined as a second side wall 15b.

The dynamic pressure is generated by the first side wall 15c and the second side wall 15b, and this will now be explained in detail.

As mentioned above, as the thrust bearing 15 is a doughnut shape, it has an inner diameter and an outer diameter, which are referred to as B and A, respectively.

Moreover, a straight line from the center O of the thrust bearing 15 to the outer diameter A is defined as H. After that, an imaginary concentric circle D between the outer diameter A and the inner diameter B is determined.

At this time, as the size and the position of the dynamic pressure by the concentric circle D, the concentric circle D is determined based on the size of the load on the upper drum 12 of the VTR head driving apparatus.

When the concentric circle D is determined, a point h where D and H meet is determined. When the point h is determined, each straight line is drawn to the outer diameter A and inner diameter B from the point h, and thereby the points d and c are determined. The angle between d and c is θ2. A line /chd formed by connecting the points c, h, and d becomes the second side wall 15b.

Moreover, a straight line H' is formed by rotating the straight line H based on the center of the thrust bearing 15 by a predetermined angle. The rotation angle relates to the dynamic pressure generating area, and the dynamic pressure generating area closely relates to the size of the dynamic pressure.

A point where H' and the concentric circle D meet is defined as g. From the point g, each straight line is drawn to the outer diameter A and inner diameter B, and thereby points a and b are determined. The angle between a and b is θ1. A line /agb formed by connecting the points a, g, and b becomes the first side wall 15c.

In the dynamic pressure generating groove 15a having the above-described structure, when the upper drum 12 is rotated after the power is applied to the stator 16 and the rotor 17, the fluid flows into the first and second side walls 15c and 15b of the dynamic pressure generating groove 15a due to the boundary friction of the fluid located between the bottom of the upper drum 12 and the upper surface of the thrust bearing 15.

The distribution of the fluid pressure is explained, referring to a graph shown in FIG. 2. At the parts A and B which are the outer diameter and inner diameter of the thrust bearing 15, the fluid pressure is the lowest. As the fluid flows into the concentric circle D from the parts A and B, the fluid pressure gradually increases. This is because the fluid flowing in from both parts A and B is gathered in the part D. At this time, a peak fluid pressure Pmax is generated at the part D.

When the peak fluid pressure becomes larger than the load of the upper drum 12, the upper drum 12 is apart from the thrust bearing 15 and it is rotated without contacting each other.

However, as the conventional bearing 15 has a single bending part h and g at the dynamic pressure generating groove 15a in order to rotate the upper drum 12 which is the rotary body with a minimum frictional force, a single peak fluid pressure is generated.

Accordingly, when the direction of the load of the upper drum 12 varies or an impact is applied from the outside, the rotational stability of the upper drum 12 decreases and vibration and oscillation can be generated.

SUMMARY OF THE INVENTION

Therefore, it is an object of the present invention to enhance the rotational stability of a rotary body by separately supporting the load of the rotary body by providing a plurality of parts of a thrust bearing each having a peak pressure which enables the rotary body to be raised from a rotary body supporting unit.

A fluid bearing apparatus having a uniform dynamic pressure distribution includes: a lower drum which is fixed and defines a center; a shaft which is fixed at the center of the lower drum; a ring-shaped thrust bearing which is fixedly mounted to the shaft; an upper drum which is rotatably mounted on the shaft and supported by the thrust bearing. A plurality of dynamic pressure generating grooves is formed at a surface where the ring-shaped thrust bearing and the upper drum meet, each of said dynamic pressure generating grooves having at least two bending points which generate a fluid pressure sufficient for raising the upper drum from the ring-shaped thrust bearing uniformly over the entire area of the ring-shaped thrust bearing.

Preferably, the bending points formed at the dynamic pressure generating grooves are connected continuously.

Alternatively, the bending points formed at the dynamic pressure generating grooves are connected discontinuously.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferable embodiments referring to the accompanying drawings.

The fluid bearing apparatus having a uniform dynamic pressure distribution according to the present invention will now be explained, with reference to the attached drawings.

Figure 1:
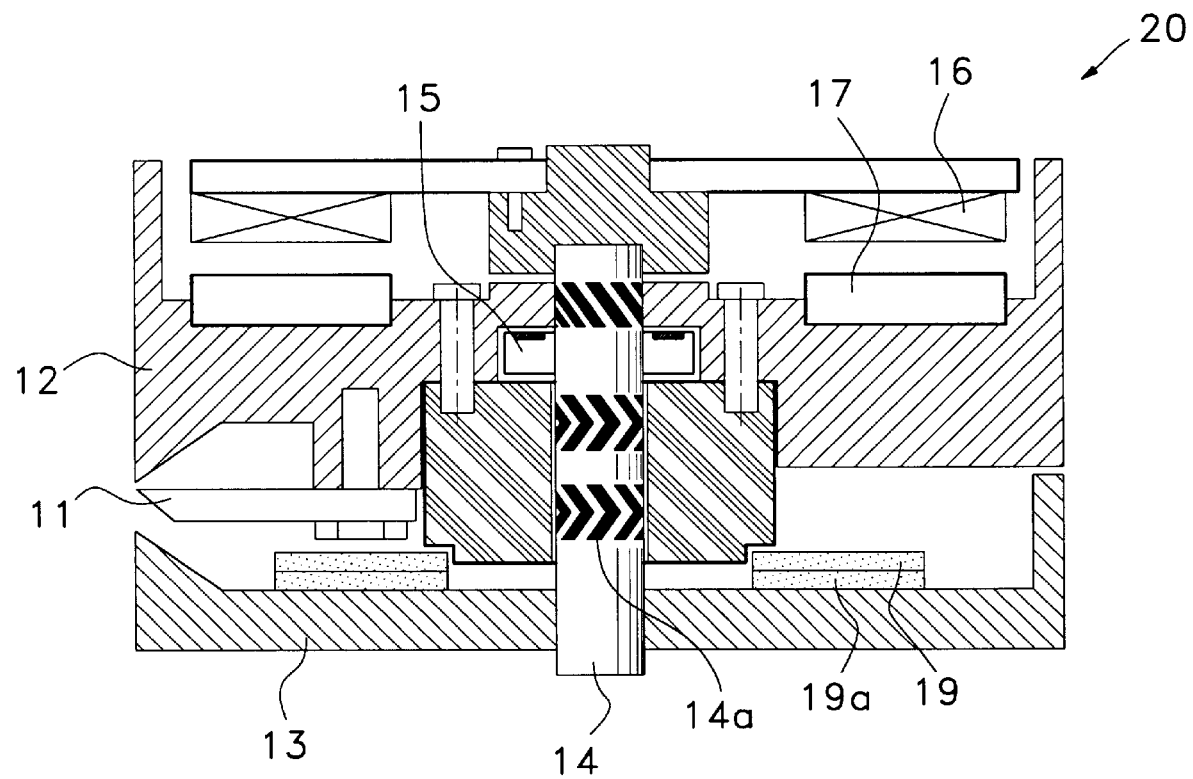
FIG. 1 is a sectional view illustrating a VTR head driving apparatus equipped with a fluid bearing apparatus employing the conventional dynamic pressure generating groove.
Figure 2:
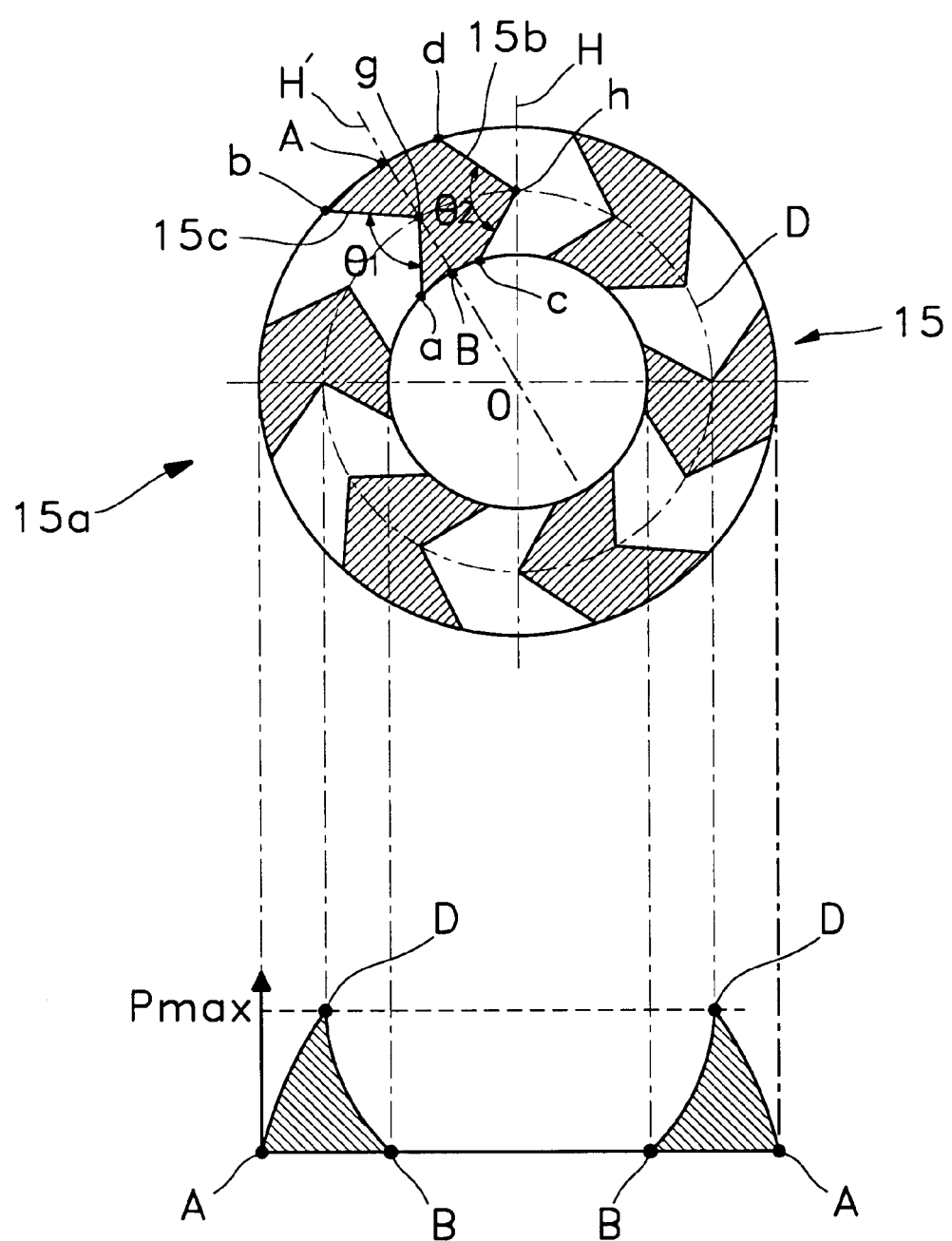
FIG. 2 is a plan view illustrating the dynamic pressure generating groove of FIG. 1.
Figure 3:
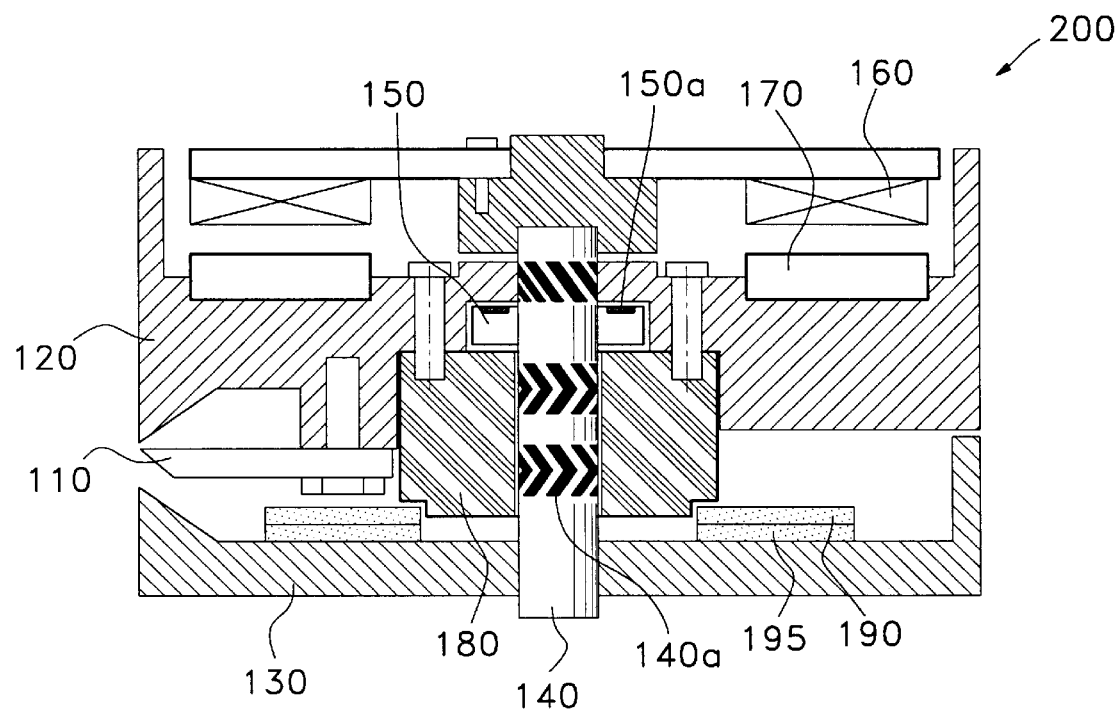
FIG. 3 is a sectional view illustrating an embodiment of the present invention which shows a VTR head driving apparatus employing the dynamic pressure fluid bearing apparatus.

FIG. 3 illustrates a VTR head driving apparatus employing a dynamic pressure fluid bearing apparatus having a uniform dynamic pressure distribution according to the present invention.

As shown in the drawing, the fluid bearing apparatus having a uniform dynamic pressure distribution includes: an upper drum 120 which is rotatably disposed and on which a head tip 110 for reading a video and audio signal recorded on a VTR tape is mounted; a lower drum 130 which is fixed; a shaft 140 which is fixed to the lower drum 130 along the rotating center of the upper drum 120; a thrust bearing 150 which is tightly fitted to the shaft 140 to support the load of the upper drum 120; and a stator 160 and a rotor 170, which are rotary force generating apparatuses.

The rotor 170 is attached to the upper surface of the upper drum 120, and the stator 160 is mounted to an upper end of the shaft 140 and is spaced apart from the rotor 170 at a predetermined distance.

On the other hand, at the upper drum 120, a bush 180 having a through hole whose diameter is slightly larger than that of the shaft 140 is formed to support the radial load which is generated when the upper drum 120 is rotated at a high speed.

Reference numerals 195 and 190 are respectively a stator transformer and a rotary transformer.

When the upper drum 120 of the VTR head driving apparatus 200 is rotated at a high speed, it is necessary to have a dynamic pressure generating groove 150a at a part where the upper drum 120 and the thrust bearing 150 meet, for generating the dynamic pressure which pushes the upper drum 120.

The thrust bearing 150 is a doughnut shape having a predetermined height and an inner diameter which is tightly fitted to the shaft 140, and a plurality of dynamic pressure generating grooves 150a are arranged in a circle at the upper surface of the thrust bearing 150.

The dynamic pressure generating grooves 150a are explained, with reference to the attached drawings.

Figure 4:
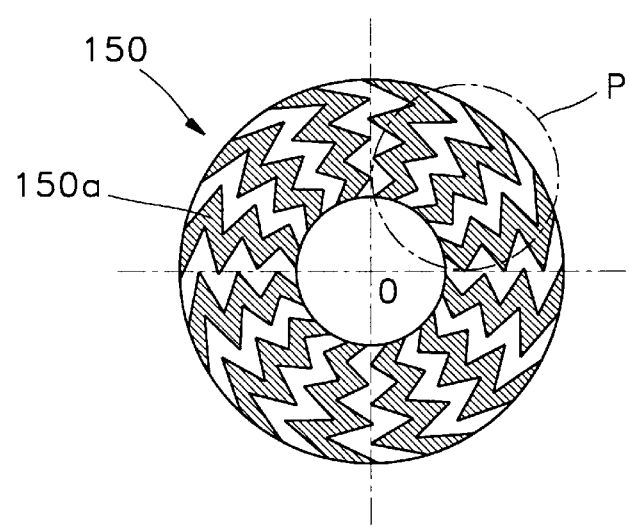
FIG. 4 is a plan view illustrating a thrust bearing according to the present invention.
Figure 5:
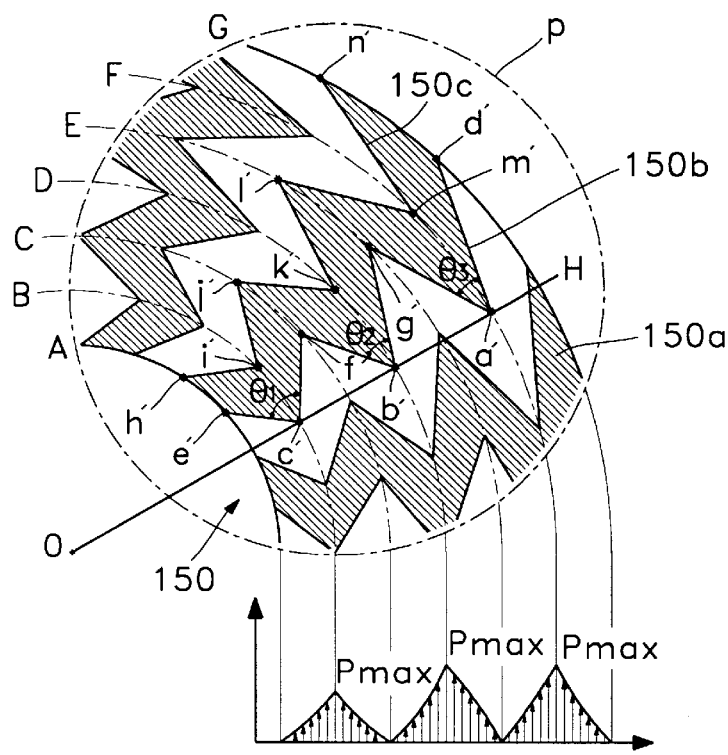
FIG. 5 is an enlarged view of a part of FIG. 4.
Figure 6:
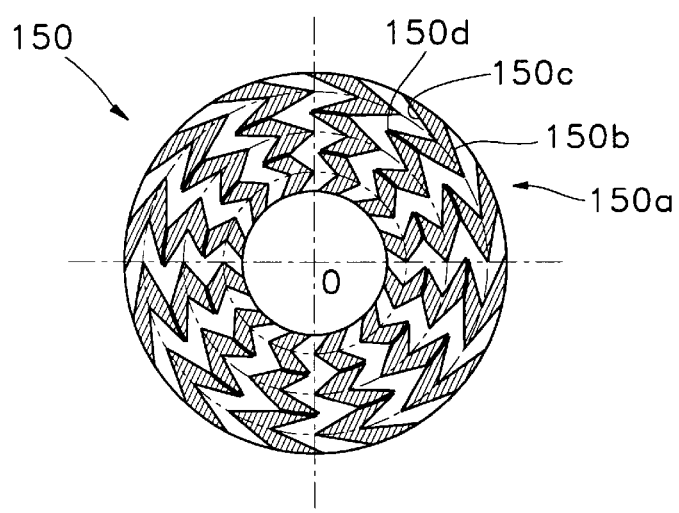
FIG. 6 is a plan view illustrating the dynamic pressure generating groove of the fluid bearing apparatus according to another embodiment of the present invention.

FIG. 4 is a plan view illustrating the thrust bearing according to the present invention, and FIG. 5 is an enlarged view of part P of FIG. 4. In addition, FIG. 6 is a plan view illustrating the dynamic pressure generating groove of the fluid bearing apparatus according to another embodiment of the present invention.

Each of the dynamic pressure generating grooves 150a according to the present invention is etched at a predetermined depth by an etching process. When etching the plain surface, there are two wall sides and one base side. Out of the two wall sides, one is defined as a first side wall 150b and the other is defined as a second side wall 150c.

In order to define clearly the position and shape of the first and second side walls 150b and 150c, a detailed explanation follows.

The inner diameter of the thrust bearing 150 having a doughnut shape is defined as A, and the outer diameter is defined as G. The imaginary concentric circles B, C, D, E and F are formed.

First, an imaginary line from the center O of the thrust bearing 150 to the outer diameter G is defined as H. After that, a part where the imaginary concentric circle B and line H meet, a part where the imaginary concentric circle D and line H meet and a part where the imaginary concentric circle F and line H meet are defined as c', b', and a', respectively.

After that, each straight line is drawn to the imaginary circles A and C starting from the generated c', and thereby the points e' and f' are determined.

The angle between e' and f' is θ1. A line /c'f' is formed by connecting the points c' and f'. Similarly, by connecting the points c' and e', a line /c'e' is formed.

Moreover, based on a line /b'f' which connects f' and b', a line is drawn to the concentric circle E starting from b', and thereby a point g' is determined. In this case, the angle between f' and g' is θ2 (here, θ<180 degrees). By connecting the determined points b' and g', a line /b'g' is obtained.

Similarly, lines /g'a' and /a'd' and angle θ3 are obtained. A line which connects the lines /e'c', /c'f', /f'b', /b'g', /g'a' and /a'd' continuously forms the first side wall 150b. The overall shape of the first side wall 150b is similar to W shapes which are continuously connected.

Moreover, to obtain the second side wall 150c, lines /n'm', /m'l', /l'k', /k'j', /j'i' and /i'h' are continuously connected, as in the first side wall 150b.

At this time, the second side wall 150c is also similar to W shapes which are continuously connected.

With the position and the shape of the dynamic pressure generating grooves by the first and second side walls 150b and 150c being as described, a plurality of bending points a', b', c', d', e', f', g', h', i', j', k', l', m' and n' are formed. The angles θ1, θ2 and θ3 are decided by the size of the upper drum 120.

The operation of the VTR head driving apparatus 200 having the thrust bearing 150 including the dynamic pressure generating grooves 150a having a plurality of bending points is illustrated in detail, with reference to the drawings.

First, the upper drum 120 is rotated in a predetermined direction at a high speed by the rotor 170 and the stator 160, the fluid located between the upper drum 120 and the thrust bearing 150 is rotated in the same direction as the upper drum 120, making a boundary friction.

At this time, the fluid is gathered in a preset direction by the bending points of the dynamic pressure generating grooves 150a of the thrust bearing 150, and the peak fluid pressure is generated at certain bending points. For example, the peak pressures are generated at c', b' and a' when the rotor is rotated in the counterclockwise direction with respect to the thrust bearing 150, as shown in FIG. 5.

Similarly, the peak pressures are generated at h', j', l' and n' when the rotor is rotated in the clockwise direction with respect to the thrust bearing 150.

Though the sizes of the fluid pressure are not exactly the same, they have a similar inclination, and thereby realizing a uniform fluid pressure over the upper surface of the thrust bearing 150.

FIG. 6 is another embodiment of the present invention. As shown in the drawing, by forming the bending points of the first side wall 150b and the bending points of the second side wall 150c discontinuously, the decrease of the fluid pressure caused by the leakage of the fluid can be prevented.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A fluid bearing apparatus having a uniform dynamic pressure distribution, comprising:

a lower drum which is fixed and defines a center;

a shaft which is fixed at the center of said lower drum;

a ring-shaped thrust bearing which is fixedly mounted to said shaft;

an upper drum which is rotatably mounted on said shaft and supported by said thrust bearing; and a plurality of dynamic pressure generating grooves formed at a surface of said ring-shaped thrust bearing facing said upper drum, each of said dynamic pressure generating grooves including a pair of side walls, with at least one of said side walls having an overall shape of at least one W so as to define at least two bending points which generate a sufficient fluid pressure for raising said upper drum from said ring-shaped thrust bearing uniformly over an entire area of said ring-shaped thrust bearing.

2. The fluid bearing apparatus of claim 1, wherein said at least two bending points formed at said dynamic pressure generating grooves are connected continuously.

3. The fluid bearing apparatus of claim 1, wherein said at least two bending points formed at said dynamic pressure generating grooves are connected discontinuously.

* * * * *